Nov. 1, 1955
R. C. CLAMPITT
2,722,245
SAW OILER
Filed March 14, 1952
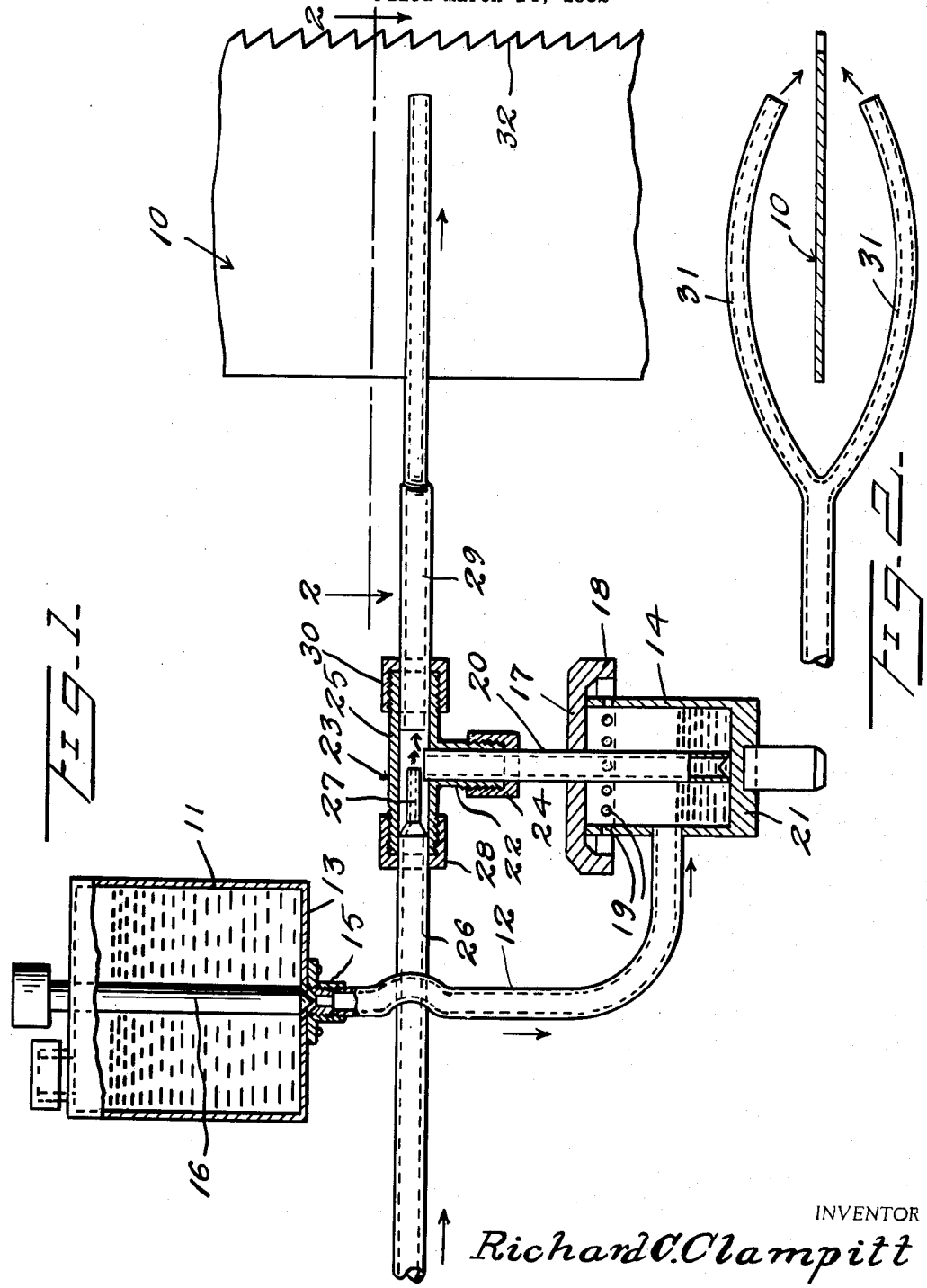
INVENTOR
*Richard C. Clampitt*
BY
*Kimmel & Crowell* ATTORNEYS

United States Patent Office 2,722,245
Patented Nov. 1, 1955

2,722,245

SAW OILER

Richard C. Clampitt, Tillamook, Oreg.

Application March 14, 1952, Serial No. 276,559

1 Claim. (Cl. 143—158)

This invention relates to an improved means for cleaning saws while the latter are in operation.

In movable saws of the power operated type such as band saws, jig saws or the like, the saw blades become coated with pitch, gum or the like while cutting certain woods, and when the teeth of the saw blade become filled with the pitch or gum, the blade cannot readily cut the wood. It is, therefore, an object of this invention to provide apparatus for spraying oil or other liquid in mist form onto the saw blade so that any gummy material in the wood will not stick to the blade.

Another object of this invention is to provide a saw blade oiler which can be combined with the present construction of saws and will improve the cutting action as well as increase the life of the saw blade.

With the above and other objects in view, my invention consists in the arrangement, combination and details of construction disclosed in the drawing and specification, and then more particularly pointed out in the appended claim.

In the drawing:

Figure 1 is a vertical section partly in detail of a saw oiling device constructed according to an embodiment of this invention.

Figure 2 is a fragmentary sectional view taken on the line 2—2 of Figure 1.

Referring to the drawing, the numeral 10 designates generally a saw blade which is preferably a band saw or jig saw blade. In order to provide a means whereby the blade 10 may be maintained in a relatively clean condition during the cutting through wood or other material which contains pitch or other gummy material, I have provided a blade oiling apparatus which includes an oil or liquid reservoir 11.

The reservoir 11 has an outlet pipe 12 connected with the bottom 13 thereof and the pipe 12 is connected to a receptacle 14 fully described hereinafter. The bottom 13 of the reservoir 11 is formed with a valve seat 15, and an adjustable needle valve 16 is disposed vertically in the reservoir 11 and is adjustable relative to the seat 15 so as to provide for the desired flow of oil or other liquid from the reservoir 11 to the receptacle 14.

The receptacle 14 has a cap 17 disposed on the upper end thereof formed with an annular down-turned flange 18 of a diameter substantially greater than the diameter of the receptacle 14 so as to form a hood substantially covering a plurality of air inlet openings 19 formed in the upper end portion of the receptacle 14.

A vertically disposed suction pipe 20 is extended through the cap or hood 17 and terminates at a point closely adjacent the bottom wall 21 of the receptacle 14. The pipe 20 is connected to the central branch 22 of a T 23, and a nut or threaded cap 24 tightly secures the pipe 20 in the branch 22 with the upper end of pipe 20 projecting slightly into the horizontal head or branch 25 of the T 23. A pressure pipe 26 is connected to one end of the horizontal branch or head 25 and is connected to a suitable source of air pressure supply.

The inner or forward end of the pipe 26 is formed with a reduced nozzle 27 projecting partly over the open upper end of the pipe 20 so that air discharged from the nozzle 27 in a forward direction will draw oil upwardly through the pipe 20 from the receptacle 14 and will break up the oil into a fine mist or spray. The pipe 20 is secured to one end of the head or branch 25 by means of a nut or cap 28.

An outlet pipe 29 is connected with the head or branch 25, being secured therein by means of a nut or cap 30. The pipe 29 is adapted to be of any suitable length so that the receptacle 14 and the apparatus hereinbefore described may be disposed in a remote position from the saw blade 10. The forward end of the pipe 29 has secured thereto a pair of longitudinally bowed nozzles 31, which are adapted to engage on opposite sides of the blade 10. The forward ends of the nozzles 31 are positioned at a point spaced rearwardly from the teeth 32 of the blade 10 so that the mist or spray discharged from the nozzles 31 will be discharged onto a portion of the blade 10 rearwardly of the teeth 32 and will also be discharged onto the teeth 32.

In the use and operation of this device, the spray nozzles 31 are disposed on opposite sides of the blade 10, as shown in Figure 2. When the blade 10 is in operation or moving, air pressure is discharged into the T 23 and the air discharged from nozzle 27 will draw up oil through pipe 20 from receptacle 14. The receptacle 14 and the T 23 together with their respective associated elements comprise an aspirator type vaporizer whereby the oil drawn up into branch or head 25 of T 23 will be broken up into a fine spray or mist by the force of air discharged from nozzle 27 so that the mist of oil will be discharged from nozzles 31 onto the opposite sides of saw blade 10. The amount of oil discharged into receptacle 14 may be closely regulated by adjustment of needle valve 16 in reservoir 11.

The use of this apparatus will eliminate the sticking of any gummy material onto the sides of the blade and the teeth so that the cutting action of the blade 10 will not be impaired as the blade progresses through wood which is of a gummy characteristic.

I do not mean to confine myself to the exact details of construction herein disclosed, but claim all variations falling within the purview of the appended claim.

What is claimed:

A saw oiler comprising a reservoir for oil, an aspirator type vaporizer including a covered receptacle having peripheral apertures in the upper side thereof, a line extending from said reservoir to said receptacle to supply a head of oil to said receptacle, a suction tube extending into said receptacle, a T-shaped mixing chamber disposed above said receptacle and below said reservoir and having its base connected to said suction line, an air pressure line including a nozzle disposed in said T-shaped mixing chamber, an outlet line connected to the other end of said mixing chamber, a pair of rigid arcuate ducts at the end of said outlet line terminating in discharge nozzles disposed at an acute angle to each other and adapted to be positioned on opposite sides of a saw blade.

References Cited in the file of this patent

UNITED STATES PATENTS

| 458,523 | Elliott | Aug. 25, 1891 |
| 1,766,663 | McClure | June 24, 1930 |
| 1,812,942 | Gaines | July 7, 1931 |
| 2,206,730 | Pihlquist et al. | July 2, 1940 |
| 2,417,403 | Zonis | Mar. 11, 1947 |